(12) United States Patent
Obrist et al.

(10) Patent No.: US 10,989,273 B2
(45) Date of Patent: Apr. 27, 2021

(54) POWER UNIT

(71) Applicant: Obrist Technologies GmbH, Lustenau (AT)

(72) Inventors: Frank Obrist, Bregenz (AT); Tsuneo Konno, Tokyo (JP); Oliver Obrist, Dornbirn (AT)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 0 days.

(21) Appl. No.: 16/190,745

(22) Filed: Nov. 14, 2018

(65) Prior Publication Data

US 2019/0264776 A1 Aug. 29, 2019

(30) Foreign Application Priority Data

Feb. 26, 2018 (DE) ...................... 10 2018 104 256.6
Feb. 28, 2018 (DE) ...................... 10 2018 104 546.8

(51) Int. Cl.
*F16F 15/26* (2006.01)
*B60K 6/24* (2007.10)
(Continued)

(52) U.S. Cl.
CPC .............. *F16F 15/264* (2013.01); *B60K 6/24* (2013.01); *B60K 6/40* (2013.01); *B60K 6/46* (2013.01);
(Continued)

(58) Field of Classification Search
CPC .......... F16F 15/264; F16F 15/26; F16F 15/30; B60K 6/24; B60K 6/40; B60K 6/46;
(Continued)

(56) References Cited

U.S. PATENT DOCUMENTS 6,530,979 B2 * 3/2003 Firey ...................... B01D 45/16
   415/169.2
7,533,639 B1 5/2009 Berger et al.
(Continued)

FOREIGN PATENT DOCUMENTS

CN 201367943 Y 12/2009
CN 103282622 A 9/2013
(Continued)

OTHER PUBLICATIONS

Office Action for German Patent Application No. 10 2018 104 546.8, dated Oct. 30, 2018, 11 pages.
(Continued)

*Primary Examiner* — Joseph J Dallo
*Assistant Examiner* — Yi-Kai Wang
(74) *Attorney, Agent, or Firm* — Westman, Champlin & Koehler, P.A.

(57) ABSTRACT

The invention relates to a power unit, in particular for a hybrid vehicle, comprising a two-cylinder reciprocating piston engine comprising two pistons guided in two cylinders in tandem arrangement, and two counter-rotating crankshafts connected to the pistons by connecting rods, a generator which is rotatable in the same direction as the first crankshaft and in the opposite direction to the second crankshaft, and a balancer shaft which is rotatable in the same direction as the second crankshaft and in the opposite direction to the first crankshaft. The generator is operatively connected directly to the first crankshaft by a first traction mechanism and the balancer shaft is operatively connected directly to the second crankshaft by a second traction mechanism. The balancer shaft and/or the second crankshaft support(s) a flywheel mass element. The invention further relates to a vehicle, in particular a hybrid vehicle, having such a power unit.

12 Claims, 2 Drawing Sheets

(51) Int. Cl.

| | | |
|---|---|---|
| *F02B 63/04* | (2006.01) | |
| *F02B 75/20* | (2006.01) | |
| *F02F 7/00* | (2006.01) | |
| *F16F 15/30* | (2006.01) | |
| *F16H 7/02* | (2006.01) | |
| *F16H 7/06* | (2006.01) | |
| *B60K 6/46* | (2007.10) | |
| *F02B 75/22* | (2006.01) | |
| *F01B 21/02* | (2006.01) | |
| *F16F 15/28* | (2006.01) | |
| *B60K 6/40* | (2007.10) | |
| *F01B 1/10* | (2006.01) | |
| *F02B 67/06* | (2006.01) | |
| *F02B 75/18* | (2006.01) | |

(52) U.S. Cl.
CPC ............... *F01B 1/10* (2013.01); *F01B 21/02* (2013.01); *F02B 63/04* (2013.01); *F02B 63/042* (2013.01); *F02B 67/06* (2013.01); *F02B 75/20* (2013.01); *F02B 75/228* (2013.01); *F02F 7/0007* (2013.01); *F16F 15/26* (2013.01); *F16F 15/28* (2013.01); *F16F 15/30* (2013.01); *F16H 7/02* (2013.01); *F16H 7/06* (2013.01); *F02B 2075/1808* (2013.01)

(58) Field of Classification Search
CPC .......... F01B 1/10; F01B 21/02; F02B 63/042; F02B 67/06; F02B 75/20; F02B 75/228; F02B 2075/1808; F02F 7/0007; F16H 7/02; F16H 7/06
USPC ....................................................... 123/59.6
See application file for complete search history.

(56) References Cited

U.S. PATENT DOCUMENTS

| | | | |
|---|---|---|---|
| 9,103,276 B2 | 8/2015 | Obrist et al. | |
| 10,132,237 B2 | 11/2018 | Laimboeck et al. | |
| 10,221,758 B2 | 3/2019 | Laimboeck et al. | |
| 10,605,163 B2 | 3/2020 | Laimboeck et al. | |
| 2009/0107426 A1* | 4/2009 | Berger | B60K 6/24 123/52.4 |
| 2013/0319349 A1* | 12/2013 | Obrist | B60K 6/24 123/2 |
| 2017/0226925 A1* | 8/2017 | Laimboeck | B60K 6/24 |
| 2017/0234214 A1* | 8/2017 | Laimboeck | F02B 75/20 123/59.6 |
| 2019/0085761 A1 | 3/2019 | Laimboeck et al. | |

FOREIGN PATENT DOCUMENTS

| | | | | |
|---|---|---|---|---|
| CN | 107107728 A | 8/2017 | | |
| CN | 107429611 A | 12/2017 | | |
| DE | 10 2006 009 093 A1 | 8/2008 | | |
| DE | 10 2014 115 041 A1 | 4/2016 | | |
| DE | 10 2014 115 042 A1 | 4/2016 | | |
| DE | 10 2014 115 043 A1 | 4/2016 | | |
| DE | 10 2014 115 044 A1 | 4/2016 | | |
| DE | 102014115042 A1 * | 4/2016 | ............. | F02B 75/18 |
| EP | 2 633 166 A1 | 9/2013 | | |
| JP | 2012225264 A | 11/2012 | | |
| KR | 1020130117796 A | 10/2013 | | |
| KR | 10-2017-0080606 A | 7/2017 | | |
| KR | 10-2017-0083052 A | 7/2017 | | |
| WO | 2012/056275 A1 | 5/2012 | | |
| WO | WO-2016058811 A1 * | 4/2016 | ............. | F02B 67/06 |

OTHER PUBLICATIONS

First Office Action, including Search Report, for Chinese Patent Application No. 201811123391.0, dated Dec. 23, 2019, 16 pages.
Office Action for Korean Patent Application No. 10-2019-0017743, dated Feb. 13, 2020, 10 pages.
Third Office Action for Chinese Patent Application No. 201811123391.0, dated Sep. 2, 2020, 8 pages.
Office Action for Korean Patent Application No. 10-2019-0017743, dated Oct. 13, 2020, 9 pages.

* cited by examiner

POWER UNIT

CROSS-REFERENCE TO RELATED APPLICATION(S)

This application claims priority to German Patent Application Nos. 10 2018 104 256.6, filed on Feb. 26, 2018; and 10 2018 104 546.8, filed on Feb. 28, 2018, the contents of which are hereby incorporated by reference in their entireties.

FIELD

The invention relates to a power unit as well as a vehicle, in particular a hybrid vehicle having such a power unit.

BACKGROUND

Power units having a two-cylinder reciprocating piston engine, the pistons of which are guided in two cylinders in tandem arrangement and which comprise two counter-rotating crankshafts connected to the pistons by connecting rods are generally known from the prior art. In particular DE 10 2014 115 042 A1, DE 10 2014 115 041 A1, DE 10 2014 115 044 A1 and EP 2 633 166 B1 which trace back to the applicant exhibit such power units.

Common to the known power units is that they comprise a generator which is operatively connected to one of the crankshafts. Some variants of known power units additionally comprise a balancer shaft which is likewise operatively connected to one of the crankshafts.

The previously known power units can be used for a diverse range of applications. They are preferably used in hybrid vehicles. The previously known power units are in particular designed for a rated electrical power output of approximately 85 kW.

SUMMARY

The invention is based on the task of further developing the existing basic concept and in particular expanding the areas of application in which lower outputs are sufficient. At the same time, the power unit is to be able to be manufactured in series as economically as possible. A further task of the invention consists of specifying a vehicle having such a power unit.

According to the invention, this task is solved by a novel power unit according to claim 1 and, with respect to the vehicle, by the subject matter of claim 12.

Specifically, the invention is based on the idea of specifying a power unit, particularly for a hybrid vehicle, which has a two-cylinder reciprocating piston engine. The two-cylinder reciprocating piston engine comprises two pistons and two counter-rotating crankshafts. The pistons are guided in two cylinders in tandem arrangement. The crankshafts are connected to the pistons by connecting rods. The power unit further comprises a generator which is rotatable in the same direction as the first crankshaft and in the opposite direction to the second crankshaft, as well as a balancer shaft which is rotatable in the same direction as the second crankshaft and in the opposite direction to the first crankshaft. The generator is thereby operatively connected directly to the first crankshaft by a first traction mechanism, whereby the balancer shaft is operatively connected directly to the second crankshaft by a second traction mechanism. The balancer shaft and/or the second crankshaft support(s) a flywheel mass element.

The invention is based on the idea of replacing a second generator, as provided for example in the prior art according to DE 10 2014 115 042 A1, with a flywheel mass element on the balancer shaft and/or the second crankshaft. The flywheel mass element enables achieving the quiet running also exhibited by the known power unit. Thus, the reduction in output is not accompanied by further adverse effects to the advantages of known power units.

At the same time, the same identical components can be used as with other previously known power units of higher output level. Thus resulting is a component system enabling economical power units of different output levels to be manufactured. In particular, the two-cylinder reciprocating piston engine can thus be kept as the identical basic module of the component system for different output levels. The series production costs can thereby be substantially reduced.

It is preferentially provided for an amount of rotating mass (flywheel mass) of the flywheel mass element to substantially correspond to the sum of the amounts of the rotating masses of the generator and the first crankshaft. Altogether, it is preferably provided for the generator and the first crankshaft to rotate in the same direction during operation, whereby the balancer shaft and the second crankshaft in turn rotate in the same direction during operation yet in opposite direction to the rotational direction of the generator and the first crankshaft. By the now preferentially provided rotating mass of the flywheel mass element, which is arranged on the balancer shaft and/or the second crankshaft, corresponding to the sum of the rotating masses of the generator and the first crankshaft, a dynamic mass balancing is achieved. Specifically, second-order mass forces can be balanced. This ensures a particularly quiet, in particular low-vibration operation of the power unit.

The advantage of the notably quiet running achieved by the inventive power unit is particularly essential when using the power unit in a hybrid vehicle. The power unit is in particular provided in combination with a serial hybrid system in which the power unit only produces electrical energy which is buffered in a storage battery and thereafter conducted to the electric motors of the powertrain. The electric motors serve as direct driving motors for the drive shaft or the driven wheels of the hybrid vehicle respectively.

As part of a serial hybrid system, the reciprocating piston engine of the power unit can be operated in an rpm range which is independent of the current driving speed. In particular, the reciprocating piston engine can be kept at a constant predetermined rpm range so as to provide electrical energy as efficiently as possible and with low fuel and pollutant emissions.

Since hybrid vehicles are equipped with a storage battery, it is also not necessary for the power unit to be continuously activated while the hybrid vehicle is driving. A control system then preferably only activates the reciprocating piston engine when electrical energy needs to be fed to the storage battery.

This results in the power unit switching on and off multiple times while the hybrid vehicle is driving. Particularly upon starting a reciprocating piston engine of conventional design, strong vibrations are thereby produced which transfer to the passenger compartment and are perceived as unpleasant.

Here is where the particularly quiet running of the inventive power unit shows its advantage, particularly in the starting behavior of the reciprocating piston engine. The balancing of the second-order mass forces substantially reduces vibrations, particularly when the motor is started. At the same time, the noise emitted by the inventive power unit is kept very low by the extremely quiet running of the reciprocating piston engine. As a result, this leads to such a quiet starting and running of the two-cylinder reciprocating piston engine that a passenger inside a hybrid vehicle equipped with the inventive power unit does not register, neither on the basis of vibrations nor on the basis of noise, that the power unit has been put into operation. Thus, hybrid vehicles of quiet running and noise emission nearly equal to vehicles fed solely by batteries can be produced.

One preferential embodiment of the power unit according to the invention provides for deflection-free guiding of the first traction mechanism between the first crankshaft and the generator and the second traction mechanism between the second crankshaft and the balancer shaft. In the context of the application, deflection-free traction mechanism guidance is then also to be understood as guidance of the traction mechanism for example by a chain adjuster or similar devices, provided it does not tap any momentum or forces.

What is essential is that transmission of power with the first traction mechanism preferably transpires exclusively at the first crankshaft and the generator. With the second traction mechanism, transmission of power preferably transpires only at the second crankshaft and the balancer shaft. Guidance arranged therebetween, for example by means of a chain adjuster, do not take up any forces of the traction mechanism such that there is no deflection as defined by the present invention.

Deflection-free guidance has the advantage of thereby reducing the number of parts moving relative to one another, thereby preventing additional noise emissions. This thus likewise contributes to quiet running, both in the acoustic as well the mechanical sense.

It is preferentially provided for only one generator to be coupled to the reciprocating piston engine. Since electric generators are expensive, the reduction to only one generator results in a corresponding reduction of costs. Available space is thereby also saved which, particularly in areas of application such as small vehicles like quads, motorcycles or other such similar vehicles, is scarce.

It is hereby noted that in the sense of the present invention, the preferential variant with only one generator only relates to an electric generator dimensioned such that the output of the reciprocating piston engine is mainly supplied to the generator and converted into electrical energy. Auxiliary generators, such as for example for an oil pump and the like, are not included. In other words, a power unit also comprises a single generator in the sense of the present invention when auxiliary generators are provided for additional component units such as, for example, an oil pump.

Referred to as a generator in the sense of the present invention is in particular a generator which is provided for feeding electrical energy into a traction battery of a hybrid vehicle, wherein the generator is dimensioned such that sufficient electrical energy can be provided to drive a hybrid vehicle. Further electric machines in the power unit, which for example operate auxiliary components, are in contrast referred to as auxiliary generators.

A further preferential embodiment of the invention provides for the first traction mechanism to connect the first crankshaft exclusively to the generator. A connection between the first crankshaft and the generator is thereby to be understood as one which transfers forces. In other words, it is provided for the first traction mechanism to connect the first crankshaft exclusively to the generator in force-transmitting manner. This in turn again improves quiet running since it eliminates further force-transmitting connections to moving parts. In addition, this design serves the compactness of the power unit.

The advantage of quiet running and compact form is thereby further improved by the second traction mechanism preferably exclusively connecting the second crankshaft to the balancer shaft, particularly in force-transmitting manner.

The first traction mechanism and second traction mechanism can in particular be of the same length. The same components can thus be used for the first traction mechanism and the second traction mechanism, whereby the degree of series production standardization can be increased. This has a positive effect on the component costs and thus the manufacturing costs of the power unit.

The first traction mechanism and second traction mechanism can each be formed by a toothed chain or a toothed belt. Utilizing a toothed belt is particularly preferential in order to keep noise emissions low. A toothed chain is characterized by increased fatigue strength and lower component costs.

Preferentially provided is for the two-cylinder reciprocating piston engine to exhibit a rated output of at least 30 kW and/or at the most 50 kW. Other output levels in the range of between 30 kW and 50 kW are possible. One preferential variant in particular provides for the two-cylinder reciprocating piston engine to exhibit a rated output of 45 kW.

In order to reduce as many component parts as possible, and thus keep the series production costs as low as possible, it is advantageously provided for the two-cylinder reciprocating piston engine to be designed strictly as a naturally aspirated engine. In the sense of the present invention, this in particular means that the two-cylinder reciprocating piston engine does not comprise a turbo-charger or electric compressor.

Preferably utilized as a balancer shaft in the inventive power unit is a shaft having a counterbalance. Specifically, it is particularly preferentially provided for the balancer shaft to be exclusively formed by a shaft having a counterbalance. The balancer shaft is thus advantageously of particularly simple construction, which simplifies series production and results in substantial cost savings.

A further aspect of the invention relates to a vehicle, in particular a hybrid vehicle having an above-described power unit. Due to the particularly quiet running of the power unit, the inventive vehicle can be regarded as particularly pleasurable to drive.

BRIEF DESCRIPTION OF THE DRAWINGS

The following will reference the accompanying schematic drawings in describing exemplary embodiments of the invention in greater detail. Shown are.

DETAILED DESCRIPTION OF THE EMBODIMENTS

Figure 1:
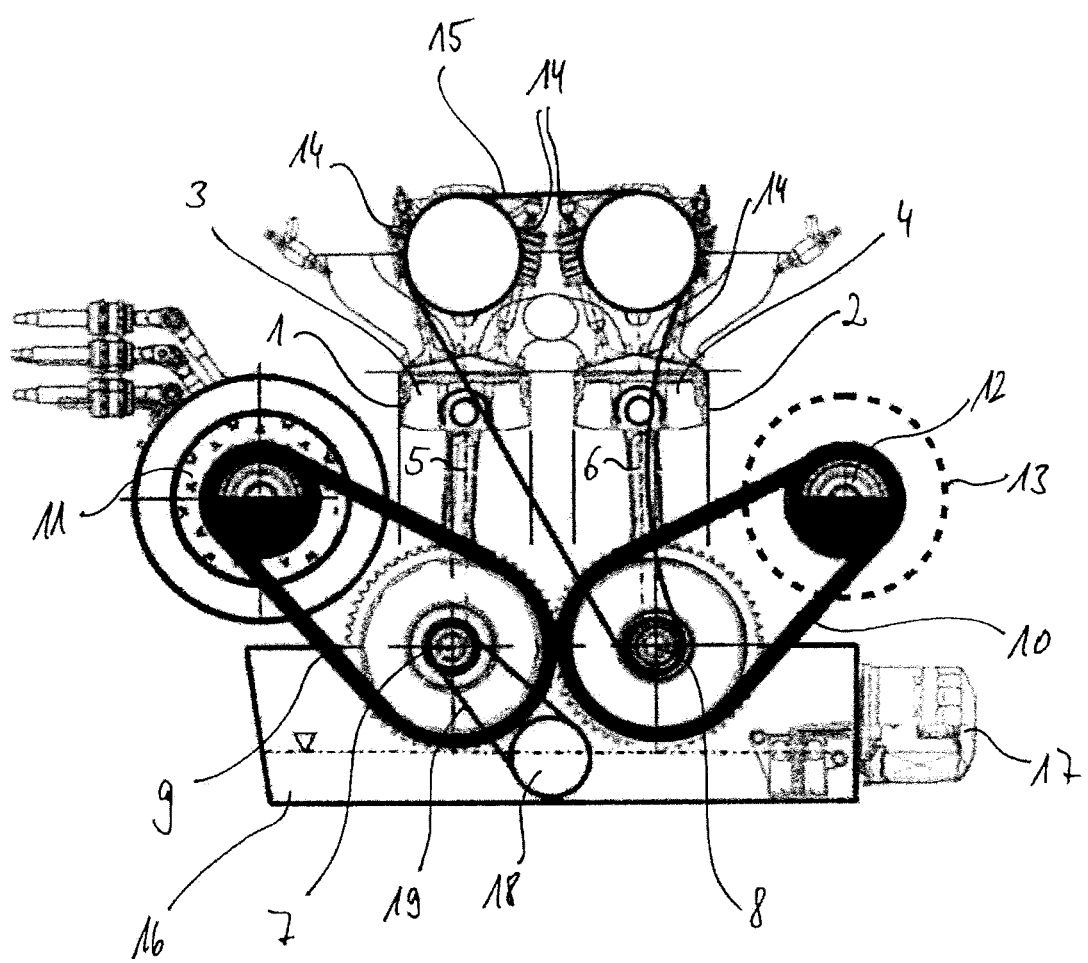
FIG. 1: a preferential exemplary embodiment of an inventive power unit, wherein the flywheel mass element is supported by the balancer shaft.

FIG. 1 shows an inventive power unit which is substantially formed by a reciprocating piston engine, a generator 11 and a balancer shaft 12. The reciprocating piston engine comprises two cylinders 1 and 2 arranged in tandem, in particular parallel to each other. Pistons 3, 4 which are each coupled in articulated manner to a respective crankshaft 7, 8 by connecting rods 5, 6 are guided in the cylinders 1 and 2. The crankshafts 7, 8 are rotatable in opposite directions and each exhibit front gearwheels 9, 10 which engage in order to synchronize the movement of the pistons 3, 4.

It is preferably provided for the distance between the articulated connections between the connecting rods 5, 6 and the pistons 3, 4 to be smaller than the distance between the crankshaft axes. The cylinders 1, 2 are thus arranged inwardly offset relative to the crankshafts 7, 8. This leads to the connecting rods 5, 6 being at a slight angle to the crankshaft axes at top dead center of the pistons, whereby piston skirt friction is reduced. This results in particularly quiet engine start.

The pistons 3, 4 and the crankshafts 7, 8 are aligned with one another such that the pistons 3, 4 run parallel to each other during the operation of the two-cylinder reciprocating piston engine. That means that the pistons 3, 4 reach top and bottom dead center in the cylinders 1, 2 at the same time. Both pistons thereby preferably traverse the same displacement.

The gearwheels 9, 10 at the front sides of the crankshafts 7, 8 can be designed as straight-toothed or helical-toothed gearwheels or spur gears. Using helical-toothed gearwheels is particularly preferential since the helical gearing achieves a substantial reduction in noise.

A generator 11 which is operatively connected directly to the first crankshaft 7 by a first traction mechanism 9 is provided to the side and arranged in a plane with the cylinders 1, 2. The first traction mechanism can in particular be formed by a toothed chain or a toothed belt. The first traction mechanism 9 extends substantially without deflection between the generator 11 and the first crankshaft 7.

A balancer shaft 12 is furthermore provided which is arranged at substantially the same height as the generator 11. The balancer shaft 12 is arranged adjacent the reciprocating piston engine in the plane of the cylinders 1, 2. The balancer shaft 12 is thereby preferably opposite the generator 11.

In other words, it is particularly preferentially provided for the rotational axes of the generator 11, the balancer shaft 12 and the two crankshafts 7, 8 to be in parallel alignment with one another. The rotational axes of the crankshafts 7, 8 thereby lie in a lower horizontal plane and the rotational axes of the generator 11 and the balancer shaft 12 lie in an upper horizontal plane. Doing so can achieve a particularly compact power unit structure, as is clearly visible in FIGS. 1 and 2.

The reciprocating piston engine also comprises (not shown) underhead camshafts which drive a plurality of valves 14. The camshafts are driven by the second crankshaft 8 by means of a third traction mechanism 15, which can be designed in particular as a belt or chain.

The reciprocating piston engine additionally comprises an oil pan 16 with an oil filter 17 and an oil pump 18, whereby the oil pump 18 is operatively connected to the first crankshaft 7 by a fourth traction mechanism 19.

In order to achieve the advantageous particularly quiet running of the power unit, a flywheel mass element 13 is provided. The flywheel mass element can be designed as a flywheel having an eccentric flywheel mass. The mass moments of inertia to be balanced result from the generator 11 causing a corresponding imbalance and thus vibrations during rotation. The flywheel mass element 13 provides the balancing by being mounted on components rotating in opposite direction to the generator 11. This relates on the one hand to the second crankshaft 8 and on the other to the balancer shaft 12.

In the exemplary embodiment according to FIG. 1, the flywheel mass element 13 is fixed to the balancer shaft 12. In particular, the balancer shaft 12 carries the flywheel mass element 13. The flywheel mass element 13 is non-rotatably connected to the balancer shaft 12. In this embodiment, the power unit at the generator 11 and the gearwheels and/or belt pulleys engaged with the respective traction mechanism 9, 10 affixed to the balancer shaft 12 have the same diameters. That results in the generator 11 and the balancer shaft 12 rotating at the same rotational speed such that the rotating mass of the generator 11 and the rotating flywheel mass of the flywheel mass element 13 are balanced. Second-order mass moments of inertia can in particular be balanced in this way.

Figure 2:
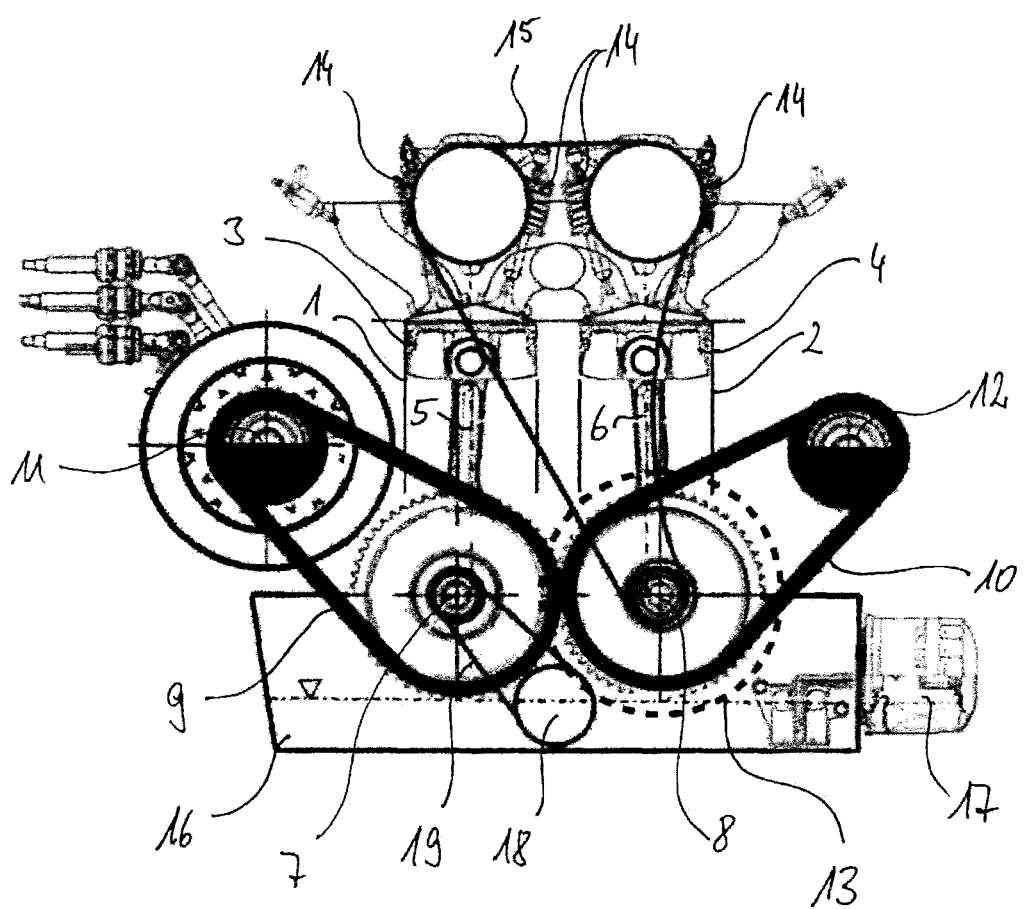
FIG. 2: a further preferential exemplary embodiment of an inventive power unit, wherein the flywheel mass element is supported by the second crankshaft.

In the exemplary embodiment according to FIG. 2, the flywheel mass element 13 is arranged on the second crankshaft 8. In particular, the second crankshaft 8 supports the flywheel mass element 13. The coupling of the flywheel mass element 13 to the second crankshaft 8 however preferably ensues indirectly via a step-up gear such that the flywheel mass element 13 rotates at twice the speed during operation compared to the second crankshaft 8.

It is basically recognizable in FIGS. 1 and 2 that the traction mechanisms 9, 10 effect a 2:1 transmission ratio between the generator 11 or balancer shaft 12 and the two crankshafts 7, 8. That means that the generator 11 rotates twice as fast as the crankshafts 7, 8. In order to now balance the mass moments of inertia significantly caused by the generator 11, it is therefore appropriate to have the flywheel mass element 13 likewise rotate at the rotational speed of the generator 11, albeit in the opposite direction. Thus, if the flywheel mass element is supported by the second crankshaft 8, a 2:1 transmission is advantageous in order for the flywheel mass element 13 to rotate twice as fast as the crankshafts 7, 8 and therefore equally as fast as the generator. The arrangement of the flywheel mass element 13 on the second crankshaft 8 in particular enables compensating for rolling moments.

Applicable to all the example embodiments is that two-cylinder reciprocating piston engine is designed strictly as a naturally aspirated engine, in particular without a turbocharger or a compressor, thus without compression of the combustion intake air. This reduces additional component costs and thereby ensures particular simplification of series production.

LIST OF REFERENCE NUMERALS 1, 2 cylinder
3, 4 piston
5, 6 connecting rod
7 first crankshaft
8 second crankshaft
9 first traction mechanism
10 second traction mechanism
11 generator
12 balancer shaft
13 flywheel mass element
14 valve
15 third traction mechanism
16 oil pan
17 oil filter
18 oil pump
19 fourth traction mechanism

What is claimed:

1. A power unit, particularly for a hybrid vehicle, comprising:
a two-cylinder reciprocating piston engine comprising exactly two pistons guided in two cylinders in tandem arrangement, and two counter-rotating crankshafts connected to the pistons by connecting rods,
a single generator which is rotatable in the same direction as the first crankshaft and in the opposite direction to the second crankshaft, and
a balancer shaft which is rotatable in the same direction as the second crankshaft and in the opposite direction to the first crankshaft,
wherein
the generator is operatively connected directly to the first crankshaft by a first traction mechanism and the balancer shaft is operatively connected directly to the second crankshaft by a second traction mechanism, wherein the balancer shaft carries a flywheel mass element, which is designed as a flywheel mass element having an eccentric flywheel mass, and wherein the balancer shaft is arranged opposite the generator with respect to a plane lying between the cylinders and the crankshafts that rotate in opposite directions to each other, and wherein the flywheel mass element is arranged in a plane with the generator.

2. The power unit according to claim 1, wherein an amount of the rotating mass of the flywheel mass element substantially corresponds to the sum of the amounts of the rotating masses of the generator and the first crankshaft.

3. The power unit according to claim 1, wherein the first traction mechanism is guided between the first crankshaft and the generator and the second traction mechanism is guided between the second crankshaft and the balancer shaft without deflection.

4. The power unit according to claim 1, wherein the first traction mechanism connects the first crankshaft exclusively to the generator.

5. The power unit according to claim 1, wherein the second traction mechanism connects the second crankshaft exclusively to the balancer shaft.

6. The power unit according to claim 1, wherein the first traction mechanism and the second traction mechanism have the same length.

7. The power unit according to claim 1, wherein the first traction mechanism and the second traction mechanism are respectively formed by a toothed chain or a toothed belt.

8. The power unit according to claim 1, wherein the two-cylinder reciprocating piston engine exhibits a rated output of at least 30 kW and/or at the most 50 kW.

9. The power unit according to claim 1, wherein the two-cylinder reciprocating piston engine is designed strictly as a naturally aspirated engine.

10. The power unit according to claim 1, wherein the balancer shaft is exclusively formed by a shaft having a counterbalance.

11. A vehicle, in particular a hybrid vehicle, having a power unit in accordance with claim 1.

12. A power unit, particularly for a hybrid vehicle, comprising:
a two-cylinder reciprocating piston engine comprising exactly two pistons guided in two cylinders in tandem arrangement, and two counter-rotating crankshafts connected to the pistons by connecting rods,
a single generator which is rotatable in the same direction as the first crankshaft and in the opposite direction to the second crankshaft, and
a balancer shaft which is rotatable in the same direction as the second crankshaft and in the opposite direction to the first crankshaft,
wherein the generator is operatively connected directly to the first crankshaft by a first traction mechanism and the balancer shaft is operatively connected directly to the second crankshaft by a second traction mechanism, and wherein the balancer shaft supports a flywheel mass element,
wherein the first traction mechanism connects the first crankshaft exclusively to the generator, the second traction mechanism connects the second crankshaft exclusively to the balancer shaft, the first traction mechanism and the second traction mechanism have the same length, and wherein the first traction mechanism and the second traction mechanism are respectively formed by a toothed chain or a toothed belt.

* * * * *